(12) United States Patent
Xu et al.

(10) Patent No.: US 11,835,417 B2
(45) Date of Patent: Dec. 5, 2023

(54) METHOD, APPARATUS AND DEVICE FOR DETECTING FIELD CURVATURE OF VR OPTICAL MODULE

(71) Applicant: GOERTEK INC., Shandong (CN)

(72) Inventors: Bo Xu, Shandong (CN); Xingxin Zhang, Shandong (CN); Zhanfa Liu, Shandong (CN); Jiehao Xu, Shandong (CN); Ling Jin, Shandong (CN); Pei Zhai, Shandong (CN)

(73) Assignee: Goertek Inc., Shandong (CN)

( * ) Notice: Subject to any disclaimer, the term of this patent is extended or adjusted under 35 U.S.C. 154(b) by 589 days.

(21) Appl. No.: 17/054,186

(22) PCT Filed: Dec. 18, 2018

(86) PCT No.: PCT/CN2018/121692
§ 371 (c)(1),
(2) Date: Nov. 10, 2020

(87) PCT Pub. No.: WO2020/062617
PCT Pub. Date: Apr. 2, 2020

(65) Prior Publication Data
US 2021/0164863 A1 Jun. 3, 2021

(30) Foreign Application Priority Data
Sep. 28, 2018 (CN) .......................... 201811143232.7

(51) Int. Cl.
*G01M 11/02* (2006.01)
*H04N 23/695* (2023.01)

(52) U.S. Cl.
CPC ...... *G01M 11/0264* (2013.01); *H04N 23/695* (2023.01)

(58) Field of Classification Search
CPC .......... G01M 11/0264; G01M 11/0242; H04N 23/695
See application file for complete search history.

(56) References Cited

U.S. PATENT DOCUMENTS

| 5,471,297 | A | 11/1995 | Tani |
| 5,812,260 | A | 9/1998 | Louisnathan |
| 10,075,685 | B1* | 9/2018 | Fulghum ............... H04N 9/3191 |
| 10,430,939 | B1* | 10/2019 | Levin ...................... G02B 27/62 |
| 2005/0243294 | A1 | 11/2005 | Smith et al. |
| 2007/0097355 | A1 | 5/2007 | Shiode |
| 2010/0141775 | A1 | 6/2010 | Vogel |
| 2017/0169747 | A1* | 6/2017 | Richards ................. G09G 3/006 |
| 2018/0246332 | A1* | 8/2018 | Wang .................. G02B 27/0025 |

FOREIGN PATENT DOCUMENTS

| CN | 1547681 | A | 11/2004 |
| CN | 1894557 | A | 1/2007 |
| CN | 102540751 | A | 7/2012 |
| CN | 202522395 | U | 11/2012 |
| CN | 106404352 | A | 2/2017 |

* cited by examiner

*Primary Examiner* — Jonathan M Hansen
(74) *Attorney, Agent, or Firm* — Baker Botts LLP

(57) ABSTRACT

Provided are a method, apparatus and device for detecting a field curvature of a VR optical module, wherein a diaphragm is fixed on a lens of a camera, a first electronic control is used to drive the VR optical module to self-rotate around an optical axis of a VR lens, and a second electronic control is used to drive the camera to swing in a plane where the optical axis of the VR lens is located with a center of the diaphragm as a fixed point.

10 Claims, 5 Drawing Sheets

METHOD, APPARATUS AND DEVICE FOR DETECTING FIELD CURVATURE OF VR OPTICAL MODULE

CROSS-REFERENCE TO RELATED APPLICATIONS

This application is a National Stage of International Application No. PCT/CN2018/121692, filed on Dec. 18, 2018, which claims priority to Chinese Patent Application No. 201811143232.7, filed on Sep. 28, 2018, both of which are hereby incorporated by reference in their entireties.

TECHNICAL FIELD

The present disclosure relates to the technical field of field curvature testing, and more specifically, to a method for detecting a field curvature of a VR optical module, an apparatus for detecting a field curvature of a VR optical module and a device for detecting a field curvature of a VR optical module.

BACKGROUND

In a VR (Virtual Reality) product, an optical module is the core display component, comprising a VR display and VR lens. The display, as the imaging element of the optical module, presents the virtual image in the human eyes through the VR lens.

At present, in order to improve the user immersion, the VR optical module tends to have a large field of view. However, a VR optical module with a larger field of view will produce a larger field curvature, such that the center field of view and the edge field of view cannot be focused at the same time, that is, the gap between the edge virtual image distance and the center virtual image distance seen by the user is large, resulting in fatigue of the user's eyes when wearing the VR product for a long time, and a poor user experience.

Therefore, after the VR optical module is assembled, a field curvature test is required for the VR optical module. At present, the accurate test of the field curvature of the VR optical module, as an evaluation criterion for the qualification of the VR optical module, has become a technical problem to be solved urgently.

SUMMARY

An object of the present disclosure is to provide a new technical solution for detecting field curvature of a VR optical module.

According to a first aspect of the present disclosure, a method for detecting a field curvature of a VR optical module is provided, wherein a diaphragm is fixed on a lens of an industrial camera, a first electronic control mechanism is used to drive the VR optical module to self-rotate around an optical axis of a VR lens, and a second electronic control mechanism is used to drive the industrial camera to swing in a plane where the optical axis of the VR lens is located with a center of the diaphragm as a fixed point, the method comprising:

controlling the second electronic control mechanism to drive the industrial camera to move, so as to enable an optical axis of the lens of the industrial camera and the optical axis of the VR lens to form different set included angles, and when the optical axis of the lens of the industrial camera and the optical axis of the VR lens form any set included angle, controlling the first electronic control mechanism to drive the VR optical module to self-rotate to different set angles, and acquiring a series of images of a test pattern photographed by the industrial camera and displayed on a VR display screen corresponding to each set angle;

determining, based on each set of series of images, corresponding virtual image distance values, and selecting a maximum virtual image distance value and a minimum virtual image distance value from all the determined virtual image distance values;

determining, according to the maximum virtual image distance value and the minimum virtual image distance value, a field curvature value of the VR optical module;

detecting, according to the field curvature value of the VR optical module, whether the VR optical module meets field curvature value requirements specified by factory requirements.

Optionally, the step of determining, based on each set of series of images, corresponding virtual image distance values comprises:

determining a sharpness value of each image for each set of series of images;

selecting an image with the highest sharpness value, and acquiring a focal length value of the industrial camera when shooting corresponding to the image with the highest sharpness value;

determining, according to a corresponding relationship between pre-calibrated focal length values and the virtual image distance values, the virtual image distance value of the image with the highest sharpness value.

Optionally, the step of selecting a maximum virtual image distance value and a minimum virtual image distance value from all the determined virtual image distance values comprises:

determining the virtual image distance values of the series of images corresponding to each set angle based on the series of images of the test pattern displayed on the VR display screen corresponding to each set angle;

calculating an average value of the virtual image distance values of the series of images corresponding to each set angle to obtain an average value of the virtual image distances, and taking the average value of the virtual image distances as a virtual image distance value when the optical axis of the lens of the industrial camera and the optical axis of the VR lens form a corresponding set included angle;

selecting the maximum virtual image distance value and the minimum virtual image distance value from a corresponding virtual image distance value when the optical axis of the lens of the industrial camera coincides with the optical axis of the VR lens, and the corresponding virtual image distance values when the optical axis of the lens of the industrial camera and the optical axis of the VR lens form different set included angles.

Optionally, the step of controlling the second electronic control mechanism to drive the industrial camera to move, so as to enable an optical axis of the lens of the industrial camera and the optical axis of the VR lens to form different set included angles, and when the optical axis of the lens of the industrial camera and the optical axis of the VR lens form any set included angle, controlling the first electronic control mechanism to drive the VR optical module to self-rotate to different set angles, and acquiring a series of images of a test pattern photographed by the industrial camera and displayed on a VR display screen corresponding to each set angle comprises:

controlling the second electronic control mechanism to drive the industrial camera to move, so that the optical axis of the lens of the industrial camera coincides with the optical axis of the VR lens, and acquiring the series of images of the test pattern photographed by the industrial camera and displayed on a central field of view of the VR display screen;

controlling the second electronic control mechanism to drive the industrial camera to move, so as to enable the optical axis of the lens of the industrial camera and the optical axis of the VR lens to form different set included angles that are not zero, and when the optical axis of the lens of the industrial camera and the optical axis of the VR lens form any set included angle, controlling the first electronic control mechanism to drive the VR optical module to self-rotate to different set angles, and acquiring the series of images of the test pattern photographed by the industrial camera and displayed on the VR display screen corresponding to each set angle.

Optionally, a center area of the VR display screen displays the test pattern, and at least four test patterns are uniformly displayed on a circumference with the center of the VR display screen as a center and a radius being of different preset radius values, wherein, the lens of the industrial camera is capable of being aligned with the test pattern displayed on a corresponding circumference when the optical axis of the lens of the industrial camera and the optical axis of the VR lens form any set included angle and the VR optical module self-rotates.

According to a second aspect of the present application, an apparatus for detecting a field curvature of a VR optical module is provided, wherein a diaphragm is fixed on a lens of an industrial camera, a first electronic control mechanism is used to drive the VR optical module to self-rotate around an optical axis of a VR lens, and a second electronic control mechanism is used to drive the industrial camera to swing in a plane where the optical axis of the VR lens is located with a center of the diaphragm as a fixed point, the apparatus comprising:

an image acquisition module for controlling the second electronic control mechanism to drive the industrial camera to move, so as to enable an optical axis of the lens of the industrial camera and the optical axis of the VR lens to form different set included angles, and when the optical axis of the lens of the industrial camera and the optical axis of the VR lens form any set included angle, controlling the first electronic control mechanism to drive the VR optical module to self-rotate to different set angles, and acquiring a series of images of a test pattern photographed by the industrial camera and displayed on a VR display screen corresponding to each set angle;

a virtual image distance value determination module for determining, based on each set of series of images, corresponding virtual image distance values, and selecting a maximum virtual image distance value and a minimum virtual image distance value from all the determined virtual image distance values;

a field curvature value determination module for determining, according to the maximum virtual image distance value and the minimum virtual image distance value, a field curvature value of the VR optical module;

a detection module for detecting, according to the field curvature value of the VR optical module, whether the VR optical module meets field curvature value requirements specified by factory requirements.

According to a third aspect of the present application, an apparatus for detecting a field curvature of a VR optical module is provided, comprising a memory and a processor, wherein the memory is used to store instructions, and the instructions are used to control the processor to operate to perform the method according to any one of the first aspect.

According to a fourth aspect, a device for detecting a field curvature of a VR optical module is provided, comprising an industrial camera, a diaphragm, a tapered component, a first electric control mechanism, a second electric control mechanism, a support platform, and the apparatus for detecting the field curvature of the VR optical module according to the second aspect or the third aspect, wherein, the diaphragm is fixed on one end of the tapered component, and the other end of the tapered component is fixed on the lens of the industrial camera, the industrial camera is fixed on the first electric control mechanism, and the VR optical module is arranged on the second electric control mechanism, the first electronic control mechanism and the second electronic control mechanism are installed on the support platform, the apparatus for detecting the field curvature of the VR optical module is used to control the first electronic control mechanism to drive the VR optical module to self-rotate around an optical axis of the VR lens, the apparatus for detecting the field curvature of the VR optical module is used to control the second electronic control mechanism to drive the industrial camera to swing in a plane where the optical axis of the VR lens is located with a center of the diaphragm as a fixed point.

Optionally, the second electronic control mechanism comprises: a first motor, a second motor, a turntable, a support rod, a linear guide rail, and a telephoto lens fixing component, wherein, the support rod is fixed on the turntable along a radial direction of the turntable;

the linear guide rail is fixed on the support rod;

a telephoto lens of the industrial camera is fixed on the telephoto lens fixing component;

the first motor is used to drive the turntable to rotate, and the second motor is used to drive the telephoto lens fixing component to slide along the linear guide rail.

Optionally, the device further comprises a focusing mechanism, the apparatus for detecting the field curvature of the VR optical module is further used to control the focusing mechanism to adjust a focal length of the industrial camera.

According to an embodiment of the present disclosure, the field curvature of the VR optical module may be accurately detected, and according to the field curvature of the VR optical module, it is determined whether the assembly of the VR optical module meets the factory requirements.

Other features and advantages of the disclosure will become clear from the following detailed description of exemplary embodiments of the disclosure with reference to the drawings.

BRIEF DESCRIPTION OF THE DRAWINGS

The drawings incorporated in the specification and constituting a part of the specification illustrate the embodiments of the present disclosure, and together with the descriptions thereof are used to explain the principle of the present disclosure.

DETAILED DESCRIPTION

Figure 1:
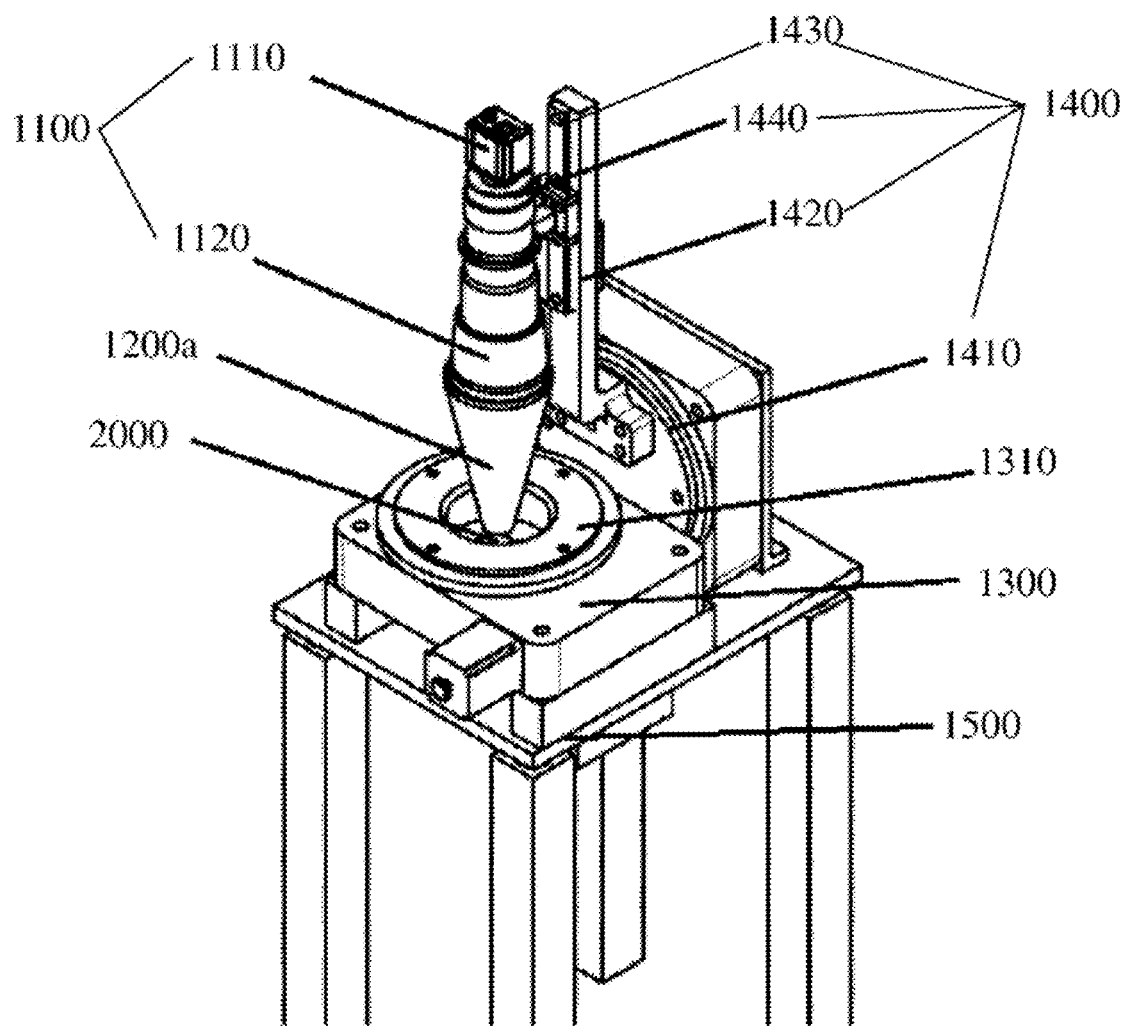
FIG. 1 is a schematic structural diagram of a device for detecting a field curvature of a VR optical module according to an embodiment of the present disclosure.

Various exemplary embodiments of the disclosure will now be described in detail with reference to the drawings. It should be noted that: unless specifically stated otherwise, the relative arrangement of components and steps, numerical expressions, and numerical values set forth in these embodiments do not limit the scope of the disclosure.

The following description of at least one exemplary embodiment is actually merely illustrative, and in no way serves as any limitation on the disclosure and its application or use.

The techniques, methods, and devices known to those of ordinary skill in the relevant fields may not be discussed in detail, but where appropriate, the techniques, methods, and devices should be regarded as a part of the specification.

In all examples shown and discussed herein, any specific values should be interpreted as exemplary only and not as limitations. Therefore, other examples of the exemplary embodiment may have different values.

It should be noted that similar reference numerals and letters indicate similar items in the following drawings, so once an item is defined in one drawing, it does not need to be further discussed in the subsequent drawings.

Device Embodiments

Figure 2:
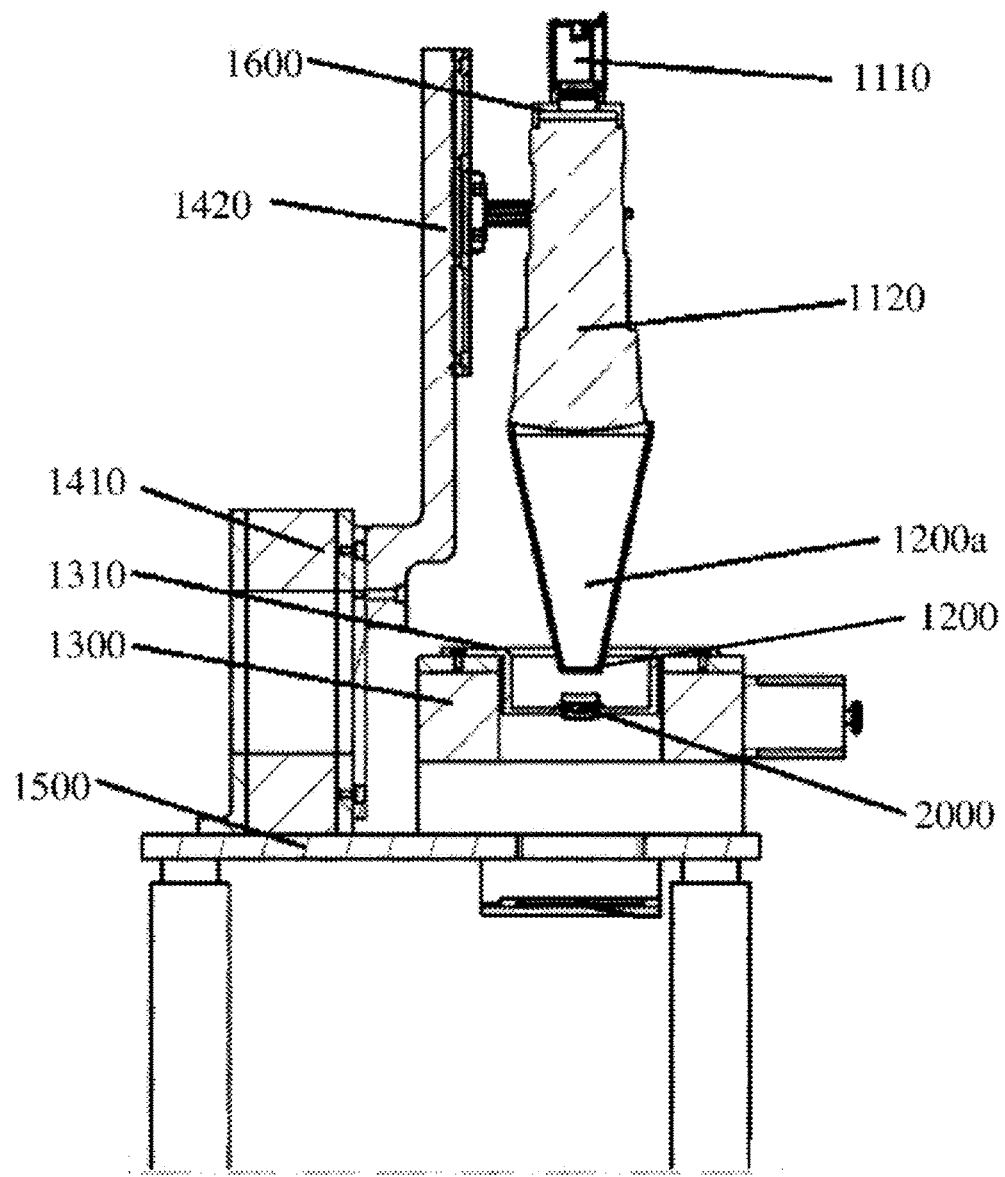
FIG. 2 is a cross-sectional view of a device for detecting a field curvature of a VR optical module according to an embodiment of the present disclosure.

FIG. 1 is a schematic structural diagram of a device for detecting a field curvature of a VR optical module according to an embodiment of the present disclosure. FIG. 2 is a cross-sectional view of a device for detecting a field curvature of a VR optical module according to an embodiment of the present disclosure.

As shown in FIG. 1 and FIG. 2, a device for detecting a field curvature of a VR optical module comprises an industrial camera 1100, a diaphragm 1200, a first electric control mechanism 1300, a second electric control mechanism 1400, a support platform 1500, and the apparatus for detecting the field curvature of the VR optical module (not shown in FIG. 1 and FIG. 2).

The device for detecting the field curvature of the VR optical module is used to control the industrial camera 1100 to photograph the test pattern displayed on the VR display screen.

The industrial camera 1100 comprises a camera body 1110 and a telephoto lens 1120.

The diaphragm 1200 is fixed on one end of the tapered component 1200a, and the other end of the tapered component is fixed on the telephoto lens 1120 of the industrial camera 1100.

The diaphragm 1200 is used to simulate the entrance pupil of the human eye and reduce the interference of stray light. The selection of the diaphragm 1200 is related to the model of the VR optical module to be tested.

The first electronic control mechanism 1300 and the second electronic control mechanism 1400 are installed on the support platform 1500.

The VR optical module is arranged on the first electronic control mechanism 1300.

In an embodiment of the present disclosure, the VR optical module is arranged on the support mechanism 1310 in the first electronic control mechanism 1300.

The VR optical module comprises a VR lens 2100 and a VR display screen 2200.

The apparatus for detecting the field curvature of the VR optical module is used to control the first electronic control mechanism 1300 to drive the VR optical module to self-rotate around an optical axis of the VR lens 2100.

The industrial camera 1100 is fixed on the second electronic control mechanism 1400.

The apparatus for detecting the field curvature of the VR optical module is used to control the second electronic control mechanism 1400 to drive the industrial camera to swing in a plane where the optical axis of the VR lens is located with a center of the diaphragm 1200 as a fixed point. In the embodiment of the present disclosure, the center of the diaphragm 1200 is the position of the center of the diaphragm when the diaphragm 1200 is moved to simulate the entrance pupil of the human eye. The position of the entrance pupil of the human eye refers to the corresponding position when it is located on the optical axis of the VR optical module and the distance to the optical center of the VR lens in the VR module is a preset distance value. The preset distance value is obtained according to actual tests, and the entrance pupil of the simulated human eye corresponding to different VR optical modules is different.

The second electronic control mechanism 1400 comprises at least a first motor (not shown in FIG. 1 and FIG. 2), a second motor (not shown in FIG. 1 and FIG. 2), a turntable 1410, a support rod 1420, a linear guide rail 1430 and a telephoto lens fixing component 1420.

The support rod 1420 is fixed on the turntable 1410 along a radial direction of the turntable 1410. The linear guide rail 1430 is fixed on the support rod 1420. The telephoto lens fixing component 1420 is arranged on the linear guide rail 1430 and can slide along the linear guide rail 1430.

The apparatus for detecting the field curvature of the VR optical module can drive the first motor to drive the turntable 1410 to rotate, so as to drive the support rod 1420 to rotate, thereby driving the industrial camera 1100 fixed on the telephoto lens fixing component 1420 to rotate.

The apparatus for detecting the field curvature of the VR optical module can drive the second motor to drive the telephoto lens fixing component 1420 to slide along the linear guide rail 1430 to drive the industrial camera 1100 fixed on the telephoto lens fixing component 1420 to slide.

In the embodiment of the present disclosure, the apparatus for detecting the field curvature of the VR optical module is controlled by the cooperation of the first motor and the second motor to drive the industrial camera 1100 to swing in a plane where the optical axis of the VR lens is located with the center of the diaphragm 1200 as a fixed point.

In an embodiment of the present disclosure, as shown in FIG. 2, the apparatus for detecting the field curvature of the VR optical module further comprises a focusing mechanism 1600. The apparatus for detecting the field curvature of the VR optical module is also used to control the focusing mechanism 1600 to adjust the focal length of the industrial camera 1100, so that the industrial camera 1100 shoots the test pattern displayed on the VR display screen with different focal lengths.

Method Embodiments

Figure 3:
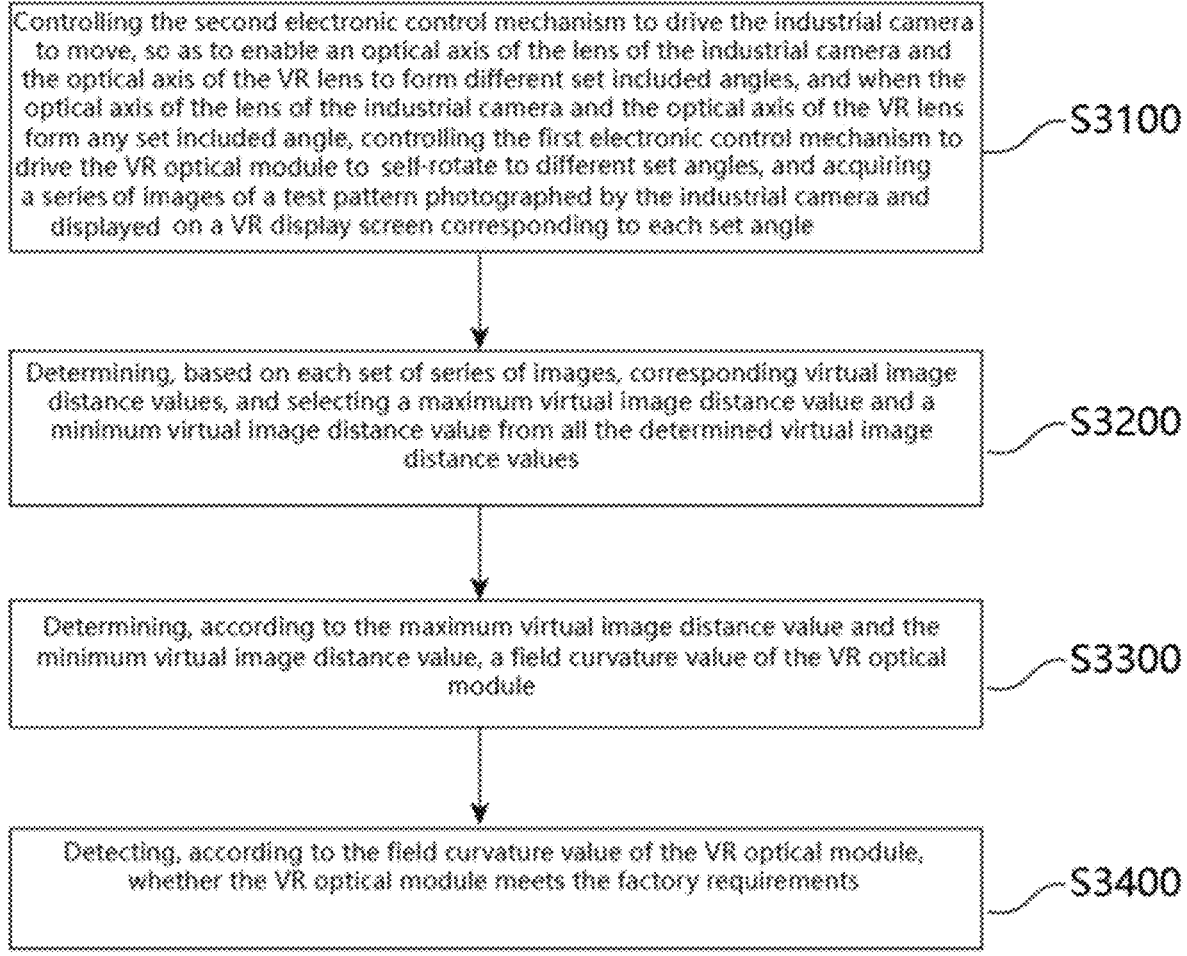
FIG. 3 is a processing flowchart of a method for detecting a field curvature of a VR optical module according to an embodiment of the present disclosure.

FIG. 3 is a processing flowchart of a method for detecting a field curvature of a VR optical module according to an embodiment of the present disclosure.

According to FIG. 3, the method of detecting at least comprises the following steps:
step S3100: controlling the second electronic control mechanism to drive the industrial camera to move, so as to enable an optical axis of the lens of the industrial camera and the optical axis of the VR lens to form different set included angles, and when the optical axis of the lens of the industrial camera and the optical axis of the VR lens form any set included angle, controlling the first electronic control mechanism to drive the VR optical module to self-rotate to different set angles, and acquiring a series of images of a test pattern photographed by the industrial camera and displayed on a VR display screen corresponding to each set angle.

In the embodiment of the present disclosure, a center area of the VR display screen displays the test pattern, and at least four test patterns are uniformly displayed on a circumference with the center of the VR display screen as a center and a radius being of different preset radius values, wherein, the lens of the industrial camera is capable of being aligned with the test pattern displayed on a corresponding circumference when the optical axis of the lens of the industrial camera and the optical axis of the VR lens form any set included angle and the VR optical module self-rotates.

Figure 5:
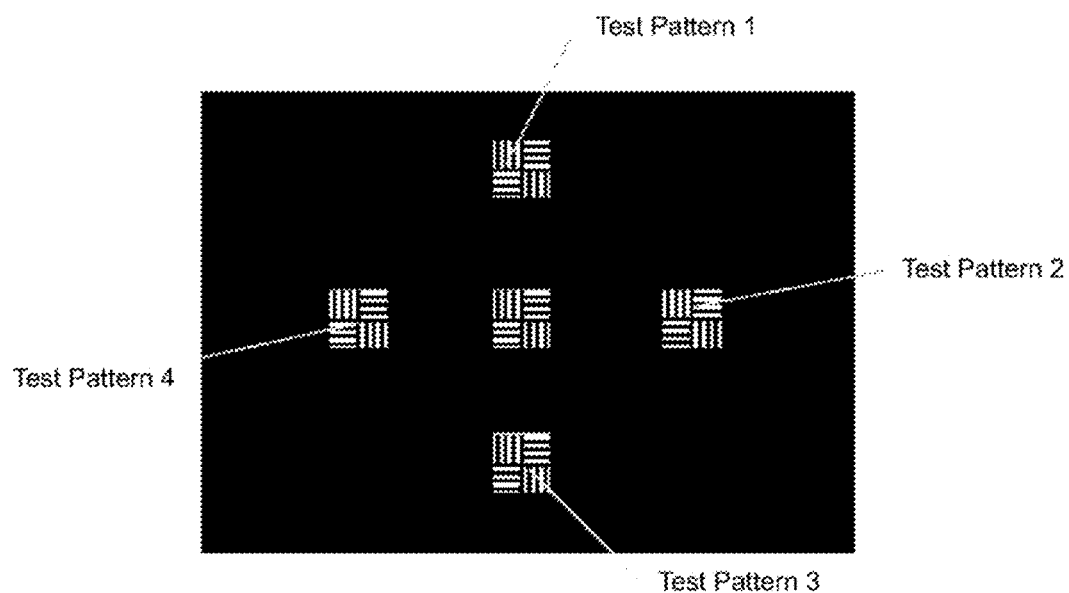
FIG. 5 shows a schematic diagram of a test pattern displayed on a VR display screen according to an embodiment of the present disclosure.

FIG. 5 shows a schematic diagram of a test pattern displayed on a VR display screen according to an embodiment of the present disclosure.

As shown in FIG. 5, a center area of the VR display screen displays the test pattern, and at least four test patterns are uniformly displayed on a circumference with a center of the VR display screen as the center and a radius being a certain preset radius value.

As a schematic diagram, FIG. 5 only shows four test patterns evenly distributed on one circumference. The four test patterns on the other circumferences of the VR display screen can also be displayed in the distribution mode shown in FIG. 5.

Figure 4:
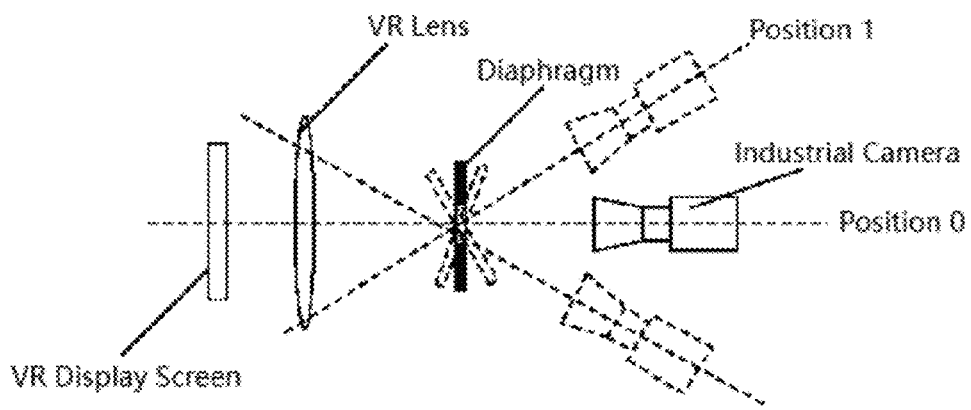
FIG. 4 is a schematic diagram of detecting a field curvature of a VR optical module according to an embodiment of the present disclosure.

As shown in FIG. 4, the apparatus for detecting the field curvature of the VR optical module is used to control the second electronic control mechanism 1400 to drive the industrial camera 1100 to swing in a plane shown in FIG. 4 with a center of the diaphragm 1200 as a fixed point.

If the first electronic control mechanism 1300 can drive the VR optical module to self-rotate 360°, the apparatus for detecting the field curvature of the VR optical module controls the second electronic control mechanism 1400 to drive the industrial camera 1100 to swing unilaterally. Taking FIG. 4 as an example, the apparatus for detecting the field curvature of the VR optical module controls the second electronic control mechanism 1400 to drive the industrial camera 1100 to swing upward or downward.

If the first electronic control mechanism 1300 can drive the VR optical module and cannot self-rotate 360°, the apparatus for detecting the field curvature of the VR optical module controls the second electronic control mechanism 1400 to drive the industrial camera 1100 to swing bilaterally. Taking FIG. 4 as an example, the apparatus for detecting the field curvature of the VR optical module controls the second electronic control mechanism 1400 to drive the industrial camera 1100 to swing upward and downward to ensure that the industrial camera 1100 can shoot images of all test patterns on a certain circumference displayed on the V R display screen.

In an embodiment of the present disclosure, step S3100 may further comprise the following steps:
step S3110, controlling the second electronic control mechanism to drive the industrial camera to move, so that the optical axis of the lens of the industrial camera coincides with the optical axis of the VR lens, and acquiring the series of images of the test pattern photographed by the industrial camera and displayed on a central field of view of the VR display screen.

For example, the apparatus for detecting the field curvature of the VR optical module controls the second electronic control mechanism 1400 to drive the industrial camera 1100 to move to the position where the optical axis of the lens of the industrial camera coincides with the optical axis of the VR lens, that is, the position 0 shown in FIG. 4, and at this time, the industrial camera 1100 is controlled to shoot the test pattern displayed in the center field of view of the VR display screen at different focal lengths to obtain a series of images.

Step S3120, controlling the second electronic control mechanism to drive the industrial camera to move, so as to enable the optical axis of the lens of the industrial camera and the optical axis of the VR lens to form different set included angles that are not zero, and when the optical axis of the lens of the industrial camera and the optical axis of the VR lens form any set included angle, controlling the first electronic control mechanism to drive the VR optical module to self-rotate to different set angles, and acquiring the series of images of the test pattern photographed by the industrial camera and displayed on the VR display screen corresponding to each set angle.

For example, the apparatus for detecting the field curvature of the VR optical module controls the second electronic control mechanism 1400 to drive the industrial camera 1100 to move until the optical axis of the lens of the industrial camera and the optical axis of the VR lens form a set included angle, that is the position 1 as shown in FIG. 4, and at this time, the industrial camera 1100 is controlled to shoot each test pattern located on the corresponding circumference of the VR display screen with different focal lengths to obtain series of images corresponding to each test pattern.

In the embodiment of the present disclosure, the number of non-zero set included angles may be determined according to the actual test requirements.

It should be noted that the execution order of step S3110 and step S3120 may be to perform the operation of step S3110 first, and then perform the operation of step S3120, or may be to perform the operation of step S3120 first, and then perform the operation of step S3110.

Step S3200, determining, based on each set of series of images, corresponding virtual image distance values, and selecting a maximum virtual image distance value and a minimum virtual image distance value from all the determined virtual image distance values.

In an embodiment of the present disclosure, determining a sharpness value of each image for each set of series of images. For example, the sharpness value of each image is calculated through a frequency domain Modulation Transfer Function (MTF). Then, the image with the highest sharpness value is selected, and the focal length value of the industrial camera 1100 during shooting corresponding to the image with the highest sharpness value is obtained. According to the corresponding relationship between the pre-calibrated focal length values and the virtual image distance values, the virtual image distance value of the image with the highest sharpness value is determined.

In the embodiment of the present disclosure, the corresponding relationship between the pre-calibrated focal length values and the virtual image distance values is obtained through the actual test. In the actual test, an industrial camera is used to shoot objects with different object distances through the VR lens in the VR optical module. Based on each object, a set of focal length values and virtual image distance values can be obtained, so that a plurality of sets of focal length values and virtual image distance values can be obtained. The plurality of sets of focal length values and virtual image distance values are processed by using a polynomial fitting algorithm, to obtain the corresponding relationship function expression between the focal length and virtual image distance. The virtual image distance value of the image with the highest sharpness value is obtained by substituting the focal length value corresponding to the image with the highest sharpness value into the function expression. In an embodiment of the present application, when the optical axis of the lens of the industrial camera and the optical axis of the VR lens to form any set included angle and the VR optical module self-rotates to a different set angle, the industrial camera 1100 may shoot a series of images of the test pattern displayed on the VR display screen corresponding to each set angle. The virtual image distance values of the series of images corresponding to each set angle is determined based on the series of images of the test pattern displayed on the VR display screen corresponding to each set angle. Then, an average value of the virtual image distance values of the series of images corresponding to each set angle is calculated to obtain an average value of the virtual image distances, and the average value of the virtual image distances is used as a virtual image distance value when the optical axis of the lens of the industrial camera and the optical axis of the VR lens form a corresponding set included angle.

Taking FIG. 5 as an example, the lens of the industrial camera is capable of being aligned with the test pattern distributed on the circumference shown in FIG. 5 when the optical axis of the lens of the industrial camera and the optical axis of the VR lens form any set included angle.

When the VR optical module self-rotates to the lens of the industrial camera to be aligned with the test pattern 1, the industrial camera shoots the test pattern 1 with different focal lengths to obtain a series of images 1. When the VR optical module self-rotates to the lens of the industrial camera to be aligned with the test pattern 2, the industrial camera shoots the test pattern 2 with different focal lengths to obtain a series of images 2. When the VR optical module self-rotates to the lens of the industrial camera to be aligned with the test pattern 3, the industrial camera shoots the test pattern 3 with different focal lengths to obtain a series of images 3. When the VR optical module self-rotates to the lens of the industrial camera to be aligned with the test pattern 4, the industrial camera shoots the test pattern 4 with different focal lengths to obtain a series of images 4.

Based on the series of images 1, the series of images 2, the series of images 3, and the series of images 4, the virtual image distance values corresponding to the series of images are respectively determined. Then, the average value of the virtual image distances corresponding to the four series of images is calculated to obtain the average value of the virtual image distances, and the average value of the virtual image distances is used as a virtual image distance value when the optical axis of the lens of the industrial camera and the optical axis of the VR lens form a corresponding set included angle. As such, the virtual image distance value when the optical axis of the lens of the industrial camera and the optical axis of the VR lens form any set included angle may be determined.

The maximum virtual image distance value and the minimum virtual image distance value are selected from a corresponding virtual image distance value when the optical axis of the lens of the industrial camera coincides with the optical axis of the VR lens, and the corresponding virtual image distance values when the optical axis of the lens of the industrial camera and the optical axis of the VR lens form different set included angles.

Step S3300, determining, according to the maximum virtual image distance value and the minimum virtual image distance value, a field curvature value of the VR optical module.

In the embodiment of the present disclosure, the field curvature value c of the VR optical module is obtained based on the following calculation formula, $$c = k * \left( \frac{1}{VID_{min}} - \frac{1}{VID_{max}} \right),$$

wherein, k is the correction coefficient, VIDmin is the minimum virtual image distance value, and VIDmax is the maximum virtual image distance value. The value of the correction coefficient k is related to the model of the VR lens.

Step S3400, detecting, according to the field curvature value of the VR optical module, whether the VR optical module meets field curvature value requirements specified by factory requirements.

In the embodiment of the present disclosure, the field curvature value of the VR optical module is compared with a preset field curvature value range, and if the field curvature value of the VR optical module is within the preset field curvature value range, it is determined that the VR optical module meets the field curvature value requirements specified by the factory requirements. If the field curvature value of the VR optical module is not within the preset field curvature value range, the VR optical module is determined to be unqualified. Wherein, the reasons for the failure of the VR optical module comprise, but are not limited to, the field curvature value of the VR lens itself does not meet the requirements, and the error in the assembly of the VR optical module is relatively large.

Apparatus Embodiments

Figure 6:
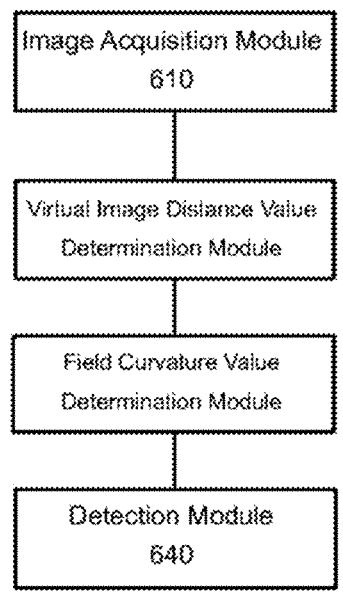
FIG. 6 is a schematic block diagram of an apparatus for detecting a field curvature of a VR optical module according to an embodiment of the present disclosure.

FIG. 6 is a schematic block diagram of an apparatus for detecting a field curvature of a VR optical module according to an embodiment of the present disclosure.

As shown in FIG. 6, the apparatus for detecting curvature of field of the VR optical module at least comprises: an image acquisition module 610, a virtual image distance value determination module 620, a field curvature value determination module 630, and a detection module 640.

The image acquisition module 610 is used for controlling the second electronic control mechanism to drive the industrial camera to move, so as to enable an optical axis of the lens of the industrial camera and the optical axis of the VR lens to form different set included angles, and when the optical axis of the lens of the industrial camera and the optical axis of the VR lens form any set included angle, controlling the first electronic control mechanism to drive the VR optical module to self-rotate to different set angles, and acquiring a series of images of a test pattern photographed by the industrial camera and displayed on a VR display screen corresponding to each set angle.

The virtual image distance value determination module 620 is used for determining, based on each set of series of images, corresponding virtual image distance values, and selecting a maximum virtual image distance value and a minimum virtual image distance value from all the determined virtual image distance values.

The field curvature value determination module 630 is used for determining, according to the maximum virtual image distance value and the minimum virtual image distance value, a field curvature value of the VR optical module.

The detection module 640 is used for detecting, according to the field curvature value of the VR optical module, whether the VR optical module meets field curvature value requirements specified by factory requirements.

In an embodiment of the present disclosure, the virtual image distance value determination module 620 is further used to: for each series of images, determine the sharpness value of each image; select the image with the highest sharpness value and obtain the focal length value of the industrial camera corresponding to the image with the highest sharpness value; determine the virtual image distance value of the image with the highest sharpness value according to the corresponding relationship between the pre-calibrated focal length values and the virtual image distance values.

In an embodiment of the present disclosure, the virtual image distance value determination module 620 is further used to: determine the virtual image distance values of the series of images corresponding to each set angle based on the series of images of the test pattern displayed on the VR display screen corresponding to each set angle; calculate an average value of the virtual image distance values of the series of images corresponding to each set angle to obtain an average value of the virtual image distances, and take the average value of the virtual image distances as a virtual image distance value when the optical axis of the lens of the industrial camera and the optical axis of the VR lens form a corresponding set included angle;

select the maximum virtual image distance value and the minimum virtual image distance value from a corresponding virtual image distance value when the optical axis of the lens of the industrial camera coincides with the optical axis of the VR lens, and the corresponding virtual image distance values when the optical axis of the lens of the industrial camera and the optical axis of the VR lens form different set included angles.

In an embodiment of the present application, the image acquisition module 610 is further used to: control the second electronic control mechanism to drive the industrial camera to move, so that the optical axis of the lens of the industrial camera coincides with the optical axis of the VR lens, and acquire the series of images of the test pattern photographed by the industrial camera and displayed on a central field of view of the VR display screen; control the second electronic control mechanism to drive the industrial camera to move, so as to enable the optical axis of the lens of the industrial camera and the optical axis of the VR lens to form different set included angles that are not zero, and when the optical axis of the lens of the industrial camera and the optical axis of the VR lens form any set included angle, control the first electronic control mechanism to drive the VR optical module to self-rotate to different set angles, and acquire the series of images of the test pattern photographed by the industrial camera and displayed on the VR display screen corresponding to each set angle.

Figure 7:
FIG. 7 is a schematic diagram of the hardware structure of an apparatus for detecting a field curvature of a VR optical module according to an embodiment of the present disclosure.

FIG. 7 is a schematic diagram of the hardware structure of an apparatus for detecting a field curvature of a VR optical module according to an embodiment of the present disclosure. Referring to FIG. 7, the apparatus for detecting the field curvature of the VR optical module comprises a memory 720 and a processor 710. The memory 720 is used to store instructions, which are used to control the processor 710 to operate to execute the method for detecting the field curvature of the VR optical module according to any embodiment of the present disclosure.

The host involved in the present disclosure may be a system, a method and/or a computer program product. The computer program product may comprise a computer readable storage medium loaded with computer readable program instructions for enabling the processor to implement various aspects of the present disclosure.

The computer readable storage medium can be a physical device capable of retaining and storing an instruction for use by an instruction execution device. The computer readable storage medium may be, for example, but not limited to, an electrical storage device, a magnetic storage device, an optical storage device, an electromagnetic storage device, a semiconductor storage device, or any suitable combination thereof. More specific examples (non-exhaustively listed) of the computer readable storage medium comprise: a portable computer disk, a hard disk, a random access memory (RAM), a read-only memory (ROM), an erasable programmable read-only memory (EPROM or flash memory), a static random access memory (SRAM), a portable compact disk read-only memory (CD-ROM), a digital video disk (DVD), a memory stick, a floppy disk, a mechanical encoding device, an in-groove protrusion structure or a punch card having stored therein an instruction, and any appropriate combinations thereof. The computer readable storage medium used herein is not explained as an instantaneous signal, such as a radio wave or other freely transmitted electromagnetic waves, an electromagnetic wave transmitted via a waveguide or other transmission medium (for example, a light pulse passing an optical fiber cable), or an electrical signal transmitted via an electric wire.

The computer readable program instruction described herein can be downloaded from the computer readable storage medium to a computing/processing device, or downloaded to an external computer or an external storage device via a network, such as an Internet, a local area network, a wide area network and/or a wireless network. The network may comprise a copper transmission cable, an optical fiber transmitter, a wireless transmitter, a router, a firewall, a switch, a gateway computer and/or an edge server. A network adapter card or a network interface in each computing/processing device receives the computer readable program instruction from the network, and forwards the computer readable program instruction, so as to store the computer readable program instruction in the computer readable storage medium of the computing/processing device.

The computer program instructions used to perform the operations of the present disclosure may be assembly instructions, instruction set architecture (ISA) instructions, machine instructions, machine-related instructions, microcode, firmware instructions, status setting data, or source codes or object codes written in any combination of one or more programming languages. The programming languages comprise object-oriented programming languages such as Smalltalk, C++, etc., and conventional procedural programming languages such as language or similar programming languages. The computer readable program instruction can be completely executed on a user computer, partially executed on the user computer, executed as an independent software packet, executed partially on the user computer and partially on a remote computer, or completely executed on the remote computer or a server. In the case of a remote computer, the remote computer may be connected to the user's computer through any kind of network, comprising a local area network (LAN) or a wide area network (WAN), or may be connected to an external computer (for example, using an Internet service provider to connect via the Internet). In some embodiments, an electronic circuit, such as a programmable logic circuit, a field programmable gate array (FPGA), or a programmable logic array (PLA), may be customized by using the status information of the computer readable program instructions. The electronic circuit may execute computer readable program instructions to implement various aspects of the present disclosure.

Here, various aspects of the present disclosure are described with reference to flowcharts and/or block diagrams of methods, devices (systems) and computer program products according to embodiments of the present disclosure. It should be understood that each block in the flow charts and/or the block diagrams can be combined with another block in the flow charts and/or the block diagrams via computer readable program instructions.

The computer readable instructions can be supplied to the processors of a general-purpose computer, a specialized computer, or other programmable data processing devices, so as to produce a machine, such that when the instruction is executed by the processors of the computers or other programmable data processing devices, a device for realizing a specified function/action in one or more blocks in the flow charts and/or the block diagrams can be generated. The computer readable program instructions can also be stored in a computer readable storage medium; the instructions enable a computer, a programmable data processing device and/or other devices to operate in a specific mode; therefore, the computer readable medium having stored therein the instructions becomes a product comprising various instructions for realizing a specified function/action in one or more blocks in the flow charts and/or the block diagrams.

The computer readable program instructions can also be loaded to a computer, other programmable data processing devices, or other devices, such that a series of operation steps can be executed on the computer, other programmable devices or other devices to generate a computer realized process; therefore, the computer, other programmable devices or other devices can execute the instructions to realize a specified function/action in one or more blocks in the flow charts and/or the block diagrams.

The flowcharts and block diagrams in the drawings show the possible implementation of the system architecture, functions, and operations of the system, method, and computer program product according to a plurality of embodiments of the present disclosure. In this regard, each block in the flowcharts or block diagrams may represent a module, a program segment, or a part of an instruction, and the module, the program segment, or the part of the instruction contains one or more executable instructions that implement the specified logic functions. In an alternative implementation, the functions marked in the blocks can also occur in an order different from the sequence in the drawings. For example, two sequent blocks actually can be executed basically in parallel, and sometimes can also be executed in a reverse order, which depends on the involved functions. It should be further noted that each block in the block diagrams and/or the flow charts, and a combination of the blocks in the block diagrams and/or the flow charts can be realized via a hardware based system specially for executing a specified function or action, or via a combination of special hardware and a computer instruction. It is well known to those skilled in the art that implementation through hardware, implementation through software, and implementation through a combination of software and hardware are all equivalent.

The embodiments of the present disclosure have been described above, and the foregoing description is illustrative, not limiting, and not limited to the disclosed embodiments. Numerous modifications and changes will be apparent to those skilled in the art without departing from the scope and spirit of the illustrated embodiments. The choice of terms used herein is intended to best explain the principles, practical applications, or the technical improvements in the market, of the embodiments, or to enable other ordinary skilled in the art to understand the embodiments disclosed herein. The scope of the present disclosure is defined by the attached claims.

The invention claimed is:

1. A method for detecting a field curvature of a VR optical module, wherein a diaphragm is fixed on a lens of a camera, a first electronic control is used to drive the VR optical module to self-rotate around an optical axis of a VR lens, and a second electronic control is used to drive the camera to swing in a plane where the optical axis of the VR lens is located with a center of the diaphragm as a fixed point, comprising:

controlling the second electronic control to drive the camera to move, so as to enable an optical axis of the lens of the camera and the optical axis of the VR lens to form different set included angles, and when the optical axis of the lens of the camera and the optical axis of the VR lens form any set included angle, controlling the first electronic control to drive the VR optical module to self-rotate to different set angles, and acquiring a series of images of a test pattern photographed by the camera and displayed on a VR display screen corresponding to each set angle;

determining, based on each of the series of images, corresponding virtual image distance values, and selecting a maximum virtual image distance value and a minimum virtual image distance value from the determined virtual image distance values; determining, according to the maximum virtual image distance value and the minimum virtual image distance value, a field curvature value of the VR optical module; and detecting, according to the field curvature value of the VR optical module, whether the VR optical module meets predetermined field curvature value requirements.

2. The method according to claim 1, wherein, the determining corresponding virtual image distance values comprises:

determining a sharpness value of each image for each set of series of images; selecting an image with the highest sharpness value, and acquiring a focal length value of the camera when shooting corresponding to the image with the highest sharpness value;

determining, according to a corresponding relationship between pre-calibrated focal length values and the virtual image distance values, the virtual image distance value of the image with the highest sharpness value.

3. The method according to claim 1, wherein, the step of selecting a maximum virtual image distance value and a minimum virtual image distance value from all the determined virtual image distance values comprises:

determining the virtual image distance values of the series of images corresponding to each set angle based on the series of images of the test pattern displayed on the VR display screen corresponding to each set angle;

calculating an average value of the virtual image distance values of the series of images corresponding to each set angle to obtain an average value of the virtual image distances, and taking the average value of the virtual image distances as a virtual image distance value when the optical axis of the lens of the camera and the optical axis of the VR lens form a corresponding set included angle;

selecting the maximum virtual image distance value and the minimum virtual image distance value from a corresponding virtual image distance value when the optical axis of the lens of the camera coincides with the optical axis of the VR lens, and the corresponding virtual image distance values when the optical axis of the lens of the camera and the optical axis of the VR lens form different set included angles.

4. The method according to claim 1, wherein the controlling the second electronic control comprises:

controlling the second electronic control to drive the camera to move, so that the optical axis of the lens of the camera coincides with the optical axis of the VR lens, and acquiring the series of images of the test pattern photographed by the camera and displayed on a central field of view of the VR display screen;

controlling the second electronic control to drive the camera to move, so as to enable the optical axis of the lens of the camera and the optical axis of the VR lens to form different set included angles that are not zero, and when the optical axis of the lens of the camera and the optical axis of the VR lens form any set included angle, controlling the first electronic control to drive the VR optical module to self-rotate to different set angles, and acquiring the series of images of the test pattern photographed by the camera and displayed on the VR display screen corresponding to each set angle.

5. The method according to claim 1, wherein, a center area of the VR display screen displays the test pattern, and at least four test patterns are uniformly displayed on a circumference with the center of the VR display screen as a center and a radius being of different preset radius values, wherein, the lens of the camera is capable of being aligned with the test pattern displayed on a corresponding circumference when the optical axis of the lens of the camera and the optical axis of the VR lens form any set included angle and the VR optical module self-rotates.

6. An apparatus for detecting a field curvature of a VR optical module, wherein a diaphragm is fixed on a lens of a camera, a first electronic control is used to drive the VR optical module to self-rotate around an optical axis of a VR lens, and a second electronic control is used to drive the camera to swing in a plane where the optical axis of the VR lens is located with a center of the diaphragm as a fixed point, comprising:

an image acquisition module for controlling the second electronic control to drive the camera to move, so as to enable an optical axis of the lens of the camera and the optical axis of the VR lens to form different set included angles, and when the optical axis of the lens of the camera and the optical axis of the VR lens form any set included angle, controlling the first electronic control to drive the VR optical module to self-rotate to different set angles, and acquiring a series of images of a test pattern photographed by the camera and displayed on a VR display screen corresponding to each set angle;

a virtual image distance value determination module for determining, based on each of the series of images, corresponding virtual image distance values, and selecting a maximum virtual image distance value and a minimum virtual image distance value from all the determined virtual image distance values;

a field curvature value determination module for determining, according to the maximum virtual image distance value and the minimum virtual image distance value, a field curvature value of the VR optical module; and a detection module for detecting, according to the field curvature value of the VR optical module, whether the VR optical module meets predetermined field curvature value requirements.

7. An apparatus for detecting a field curvature of a VR optical module, comprising a memory and a processor, wherein the memory is used to store instructions, and the instructions are used to control the processor to operate to perform the method according to claim 1.

8. A device for detecting a field curvature of a VR optical module, comprising a camera, a diaphragm, a tapered component, a first electric control, a second electric control, a support platform, and the apparatus for detecting the field curvature of the VR optical module according to claim 6, wherein, the diaphragm is fixed on one end of the tapered component, and the other end of the tapered component is fixed on a lens of the camera, the camera is fixed on the first electric control, and the VR optical module is arranged on the second electric control, the first electronic control and the second electronic control are installed on the support platform, the apparatus for detecting the field curvature of the VR optical module is adapted for use to control the first electronic control to drive the VR optical module to self-rotate around an optical axis of the VR lens, and the apparatus for detecting the field curvature of the VR optical module is adapted for use to control the second electronic control to drive the camera to swing in a plane where the optical axis of the VR lens is located with a center of the diaphragm as a fixed point.

9. The device according to claim 8, wherein, the second electronic control comprises: a first motor, a second motor, a turntable, a support rod, a linear guide rail, and a telephoto lens fixing component, wherein,
- the support rod is fixed on the turntable along a radial direction of the turntable; the linear guide rail is fixed on the support rod;
- a telephoto lens of the camera is fixed on the telephoto lens fixing component;
- the first motor is adapted for use to drive the turntable to rotate, and the second motor is adapted for use to drive the telephoto lens fixing component to slide along the linear guide rail.

10. The device according to claim 8, further comprising: a focusing, the apparatus for detecting the field curvature of the VR optical module is also adapted for used to control the focusing to adjust a focal length of the camera.

\* \* \* \* \*